May 7, 1935.  H. C. EDWARDS  2,000,828
INTERNAL COMBUSTION ENGINE
Filed Sept. 12, 1932
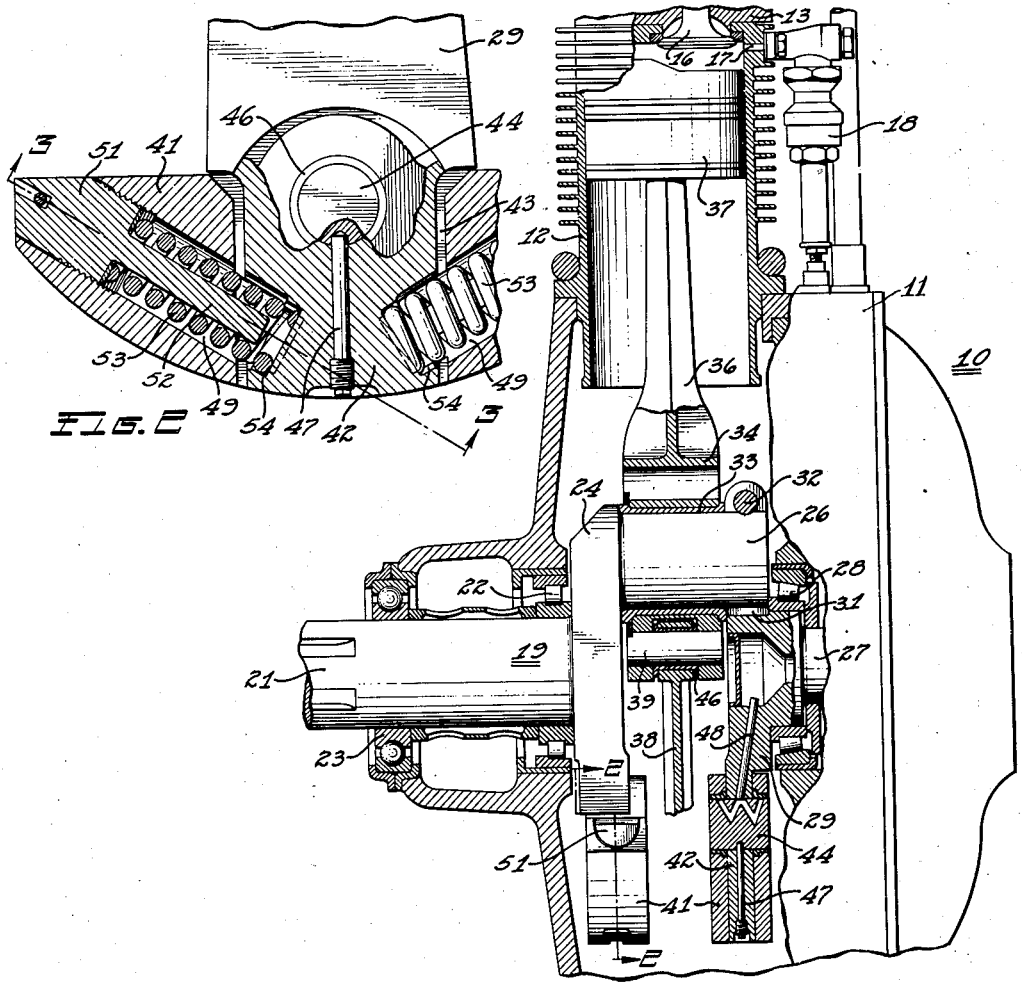
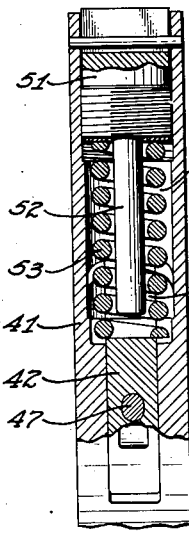
Inventor
HERBERT C. EDWARDS.

Patented May 7, 1935

2,000,828

UNITED STATES PATENT OFFICE 2,000,828

INTERNAL COMBUSTION ENGINE

Herbert C. Edwards, Detroit, Mich., assignor to Packard Motor Car Company, Detroit, Mich., a corporation of Michigan Application September 12, 1932, Serial No. 632,664

3 Claims. (Cl. 74—604)

This invention relates to internal combustion engines of the compression-ignition type and it is particularly adapted to use with aircraft engines and other high speed engines of this nature arranged to drive loads of considerable inertia, such as aircraft propellers.

As pointed out in Patent No. 1,932,331, issued October 24, 1933, to Lionel M. Woolson, engines of the above character are subject, at the time of ignition, to peak pressures of short duration but of considerable magnitude which subjects the engine parts to terrific shock loads that must be taken and transmitted to the driven member. Such loads result in direct blows delivered through the connecting rod and also take the form of high instantaneous torsional stresses caused by high acceleration given to the rotating parts which have large inertia. As a result, the forced vibrations imposed on the crank shaft system synchronize at certain constant speeds with the natural frequency of the system and thereby induce vibration in the shaft which, through resonance, grows to proportions resulting in tremendous stresses unless provision is made to reduce them.

In the above mentioned application, such stresses are reduced, and without increasing the weight of the engine, by the provision of counterweights which are pivoted on the crank shaft and resiliently connected to the crank arm extension so that they can yield somewhat and thereby cushion the piston thrust and the resulting applied torque. This system of reducing stresses is generally adequate but I have found that a further reduction is required with some types of engines.

An object of this invention is to further reduce engine stresses beyond that of the application structure by an improvement therein wherein the springs are arranged to have greater deflection, to increase the crank shaft strength through greater distance between the ends anchored in the crank shaft, and to increase the load which they can take without breaking.

Other objects of the invention will appear from the following description taken in connection with the drawing, which forms a part of this specification, and in which:

Fig. 1 is a longitudinal section through a portion of the compression-ignition engine arranged to drive a load of high inertia, showing the application of this invention thereto;

Fig. 2 is an enlarged section taken substantially on line 2—2 of Fig. 1;

Fig. 3 is a sectional view of the crank shaft system taken on line 3—3 of Fig. 2;

Referring to the drawing, at 10 is shown an aircraft engine of the well-known radial type having a crank case 11 on which is mounted a number of radially disposed cylinders, one of which is shown at 12. Each of the cylinders is provided with an integral head 13 having a combined air inlet and exhaust port 14 which is controlled by a valve 16 and adapted to be open in timed relation to the engine by a suitable operating mechanism, not shown in detail, which may be driven from the engine crank shaft or other moving engine parts in the usual way. A fuel nozzle 17 communicates with the interior of each cylinder and with a suitable pump 18 which is driven from the engine in timed relation thereto, there being a nozzle and pump for each of the engine cylinders. The pump operates to inject a measured charge of liquid fuel into the cylinders at the proper time in the cycle thereof, as is well understood in the art to which this invention relates.

The crank shaft system of this invention comprises the engine crank shaft and the elements associated therewith including the crank, the connecting and link rods and their hub, and the counterweights or balancing masses.

In the embodiment illustrated, the crank shaft 19 is of the built-up type having a forwardly extending portion 21 journaled in the bearings 22 and 23. This forward or driving portion of the crank shaft supports and drives the engine loads which may comprise an aircraft propeller (not shown).

The crank shaft 19 also comprises an integral crank arm 24 with a crank pin 26 thereon. An aligned portion 27, journaled in the bearing 28, is provided with an integral crank arm 29, secured to the crank pin in any suitable manner as by a key 31 and a clamp bolt 32, the arms 24 and 29 and the pin 26 forming the crank portion of the shaft 19. Journaled on the crank pin 26 through a suitable bushing 33 is the hub portion 34 of a master connecting rod 36, the other end of which is connected to a piston 37 in one of the engine cylinders. Similar pistons (not shown) in the other cylinders of the engine are connected by means of link rods such as 38 to link pins such as 39, pivotally mounted in the hub portion 34 and arranged in circular spaced relation therein around the crank pins in the well-known manner, so that the pressures of all the pistons are communicated to and drive the crank shaft.

The unbalanced rotating masses of the crank shaft system, which include the crank, the master rod and its hub, and the link rods and associated parts, are adapted to be counterbalanced by suitable counterweights, which comprise segmental weight members or masses 41, one of which is mounted opposite each crank arm on an integral extension 42 thereof. Each of the extensions 42 projects through a slot 43 formed in the median plane of the weight member, and said member is pivotally secured thereto by a pivot pin 44 mounted in the extension and on which the member is journaled as by bushings 46. The pins 44 may be secured to the extensions 42 by any convenient means such as a locking pin 47 and they may be lubricated through conduits 48 which communicate with the engine lubricating system (not shown).

The counterweights 41 are necessary to bring the large off-center masses into static balance about the crank shaft axis, but it will be evident that their mass is responsible for a large part of the inertia of the crank shaft system which must be overcome in accelerating the crank shaft, and that the high acceleration given to these masses by piston thrust at the high pressure moment of ignition would cause tremendous stress in the crank shaft. According to the present invention, these members are resiliently connected to the crank arm extensions so that they may yield a considerable extent and thereby cushion the piston thrust and the resulting applied torque and hence materially lower attendant stresses. To this end, each of the weights is provided with diagonally extending bores 49 which extend substantially parallel to its arcuate face into communication with the slot 43 at an acute angle relative thereto. The outer ends of these bores are closed by adjustable threaded plugs 51 having inwardly disposed guide extensions 52, which serve as abutments for stiff compression springs 53 of considerable length. The inner ends of the springs are seated in recesses 54 formed in the crank arm extension 42 which align with the bores 49, and they bear with equal force on this extension and it will be evident that the counterweight is thereby being continually urged toward its normal or neutral position with respect to the crank arm. Under the sudden impact caused by explosion pressures in the engine cylinders, one of the springs 53 will yield to permit each of the counterweights to move slightly on its pivot pin 44. Because of this construction, a large portion of the mass of the shaft assembly is coupled through resilient means which yields under the sudden torque at the time of ignition, absorbing or storing a part of the energy and permitting the inertia to be overcome more gradually and the mass less suddenly accelerated. Such elastic cushioning of the shock forces applied to the crank shaft greatly reduces the stresses that would otherwise occur in that member. After the moment of peak pressure has passed, a part of the energy which was absorbed or stored in compressing the springs 53 is returned to the crank shaft system through the reaction of the springs which, at the same time, restores the counterweight to its neutral position with respect to the arm 42.

It will be evident that this invention provides for the introduction into the crank shaft system of considerable resilience, represented by the springs 53. This resilience permits the counterweights, which represent a large portion of the mass of the system, to lag behind the crank shaft at the moments of peak torque so that the acceleration thereof is slower, thus greatly reducing the inertia stresses which would otherwise be imposed upon the shaft. At the same time, such increase in the resilience of the system, as in any other vibratory system, lowers the positions in the engine speed range at which resonant vibrations occur.

To prevent the resonant growth of such vibrations as may be induced in the crank shaft system by the forced vibrations, the present invention proposes to provide adequate damping during the disturbance. Such damping is effected by mechanical friction in the pivotal mounting of the counterweights 41, which mechanical friction serves to dissipate vibratory energy at a rate sufficient to prevent its growth through resonance. The damping of friction at the counterweight mounting occurs principally between the pin 44 and its co-operating bearings, these being subjected to high pressures because of the centrifugal force acting on the weights, and to this friction may be added that produced by the crank arm extension 42 being a close fit in the slot 43 so that the side faces of the extension are in rubbing contact with the side walls of the slot.

It will be noted that the damping effect will continue as long as there is any relative movement between the counterweights and the arm extensions, such damping extending through both the period in which energy is stored in the resilient members and the period of energy return. Because of the angular disposition of the recesses 54 there is a larger crank shaft mass between the adjacent ends thereof than when arranged in alignment, and thus the crank shaft arm is materially strengthened. Such disposition of the bores and recesses permits the use of springs having a maximum length and thus, due to increased deflection, more load can be taken thereby without breakage. This obtuse arrangement of the springs also makes the moment arm between the end of the springs and the pivot 44 a maximum length thereby providing for a maximum resistance to spring compression. It will thus be seen that, in comparison with a structure in which the springs are aligned, this angular arrangement of springs increases the crank shaft strength, increases the resistance to spring compression and increases the load which the springs can take.

The invention, therefore, provides a device for preventing the over-stressing or failure of the shafts of engines of this type in which extremely high stresses occur, and it permits the use of a light weight crank shaft adapted to safely carry the working stresses with a proper factor of safety.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. The combination with an engine crank shaft having a crank arm, of an integral extension in line with the crank arm, a counterweight having a slot adapted to receive the extension, pivot means for mounting said counterweight on said extension, and a coil spring extending diagonally of each end of the counterweight with their axes substantially in the direction of rotation, one end of said springs being stationary with the counterweight and the other end of said springs being stationary with the extension.

2. The combination with an engine crank shaft having a crank arm, of an integral extension in line with the crank arm, a counterweight on said extension, pivot means for mounting said counterweight on said extension, said counterweight and extension being formed to provide two bores extending in opposite directions and at an acute angle to the arm, and a coil spring in each bore, said springs being stationarily associated with the counterweight at one end and engaging the extension at the other end.

3. The combination with an engine crankshaft having a crank arm, of an integral extension in line with the crank arm, a counterweight having a slot adapted to receive the extension, pivot means for mounting said counterweight on said extension, and means including opposed coil springs acting between and to resist relative movement of the arm and counterweight, the axes of said springs defining an obtuse angle.

HERBERT C. EDWARDS.